J. L. THOMSON.
MEANS FOR TEACHING READING.
APPLICATION FILED APR. 25, 1916.

1,263,626.

Patented Apr. 23, 1918.
2 SHEETS—SHEET 1.

| The | 1 | it | 11 | But | 21 | made | 31 |
|---|---|---|---|---|---|---|---|
| Hen | 2 | home | 12 | said | 22 | eat | 32 |
| found | 3 | herself | 13 | No | 23 | Oh | 33 |
| bag | 4 | Then | 14 | When | 24 | yes | 34 |
| of | 5 | went | 15 | Turkey | 25 | will | 35 |
| flour | 6 | Duck | 16 | Goose | 26 | not | 36 |
| She | 7 | please | 17 | so | 27 | give | 37 |
| tried | 8 | help | 18 | had | 28 | you | 38 |
| to | 9 | me | 19 | was | 29 | any | 39 |
| carry | 10 | my | 20 | make | 30 | bread | 40 |

WITNESS:

INVENTOR,
Jennie L. Thomson.
BY
ATTORNEY.

J. L. THOMSON.
MEANS FOR TEACHING READING.
APPLICATION FILED APR. 25, 1916.

1,263,626.

Patented Apr. 23, 1918.
2 SHEETS—SHEET 2.

WITNESS
W. Bell.

INVENTOR,
Jennie L. Thomson.
ATTORNEY.

UNITED STATES PATENT OFFICE.

JENNIE L. THOMSON, OF TUNKHANNOCK, PENNSYLVANIA.

MEANS FOR TEACHING READING.

1,263,626.

Specification of Letters Patent.   Patented Apr. 23, 1918.

Application filed April 25, 1916.   Serial No. 93,389.

*To all whom it may concern:*

Be it known that I, JENNIE L. THOMSON, a citizen of the United States, residing at Tunkhannock, in the county of Wyoming and State of Pennsylvania, have invented certain new and useful Improvements in Means for Teaching Reading, of which the following is a specification.

This invention relates to the art of teaching reading, and it has for its object to provide means whereby the student is required to associate the meaning of different words with their printed or written forms and the teacher is able constantly to test the student and be certain that the latter, as he repeats sentences or other groups of words displayed before him, is doing so by actual reading and not through having had already established in his memory the words in a certain order. It is well known that one of the principal difficulties in teaching young children, who already know their letters, to read—that is, to distinguish different combination of letters from others—is that the teacher is frequently unadvised or unconscious that the child when directed to read a passage placed before him is in fact glibly repeating what he has memorized on having heard the same passage read before; and that the teacher does not become aware of the child's actual inability to read the sentence until much patient effort has been expended in reviewing the sentence with him and the rest of the class.

I accomplish the object in view by providing sheets on each of which are displayed selected words, as words from a page of a primer with which it is desired to test the students, with serial word numbers or symbols displayed conspicuously and sheet numbers or symbols displayed less conspicuously on the sheet in connection with the respective words. The sheet symbols are all alike on each sheet, but in a group of the sheets (each of which includes test words all or nearly all different from those on any other sheet) the sheet symbols will be serial, as 1, 2, 3, etc. The teacher receives, thus in convenient form, groups of sheets, respectively bearing test words chosen from a corresponding number of pages of a primer or the like, and the sheets in each group, being all alike, are correspondingly provided with division markings so that they can be divided into slips, preferably all of the same shape and size, the slips from each sheet forming a set and having different words and different word symbols thereon and also symbols showing that the slips all belong to the same sheet or set.

A set of the slips (which, however, need not necessarily be furnished to the teacher in sheet or unseparated form) is then given by the teacher to each child in the class, whereupon the teacher instructs each child (who is assumed already to know the symbols) to select the slips according to their word symbols and speak the words which appear thereon. It will be understood that the set of sheet symbols, displayed on the slips less conspicuously than the word numbers, afford means for identifying the slips with the set to which they belong, so that when not in use the slips may be grouped in packages each comprising slips forming the component parts of a complete set.

Referring, now, to the accompanying drawings,

Figure 1 is a plan view of the obverse face of a sheet containing words forming one set, serial word symbols, and division markings whereby the sheet may be cut into strips to form a set of slips;

Fig. 2 is the reverse face of the sheet shown in Fig. 1, the same containing the sheet or set symbols, one for each slip to be cut from the sheet;

Fig. 3 shows, in obverse, three selected slips cut from said sheet;

Fig. 4 shows, in reverse, said three selected slips; and,

Figs. 5 and 6 show a holder to be used by the student in formulating, as directed by the teacher, a sentence or other series of words, three slips being shown in place in Fig. 5.

*a* in Figs. 1 and 2 is one sheet from a group of sheets. In such group there will be as many sheets, all alike, as the teacher may require so that each child in the class will receive, when the several sheets have been divided into slips, a set of slips. There will be other groups of sheets, all alike as to the sheets in each group but differing from each other in the words used, in the sheet or set symbols for identifying the slips to be cut therefrom, and in the word symbols, although it may be as to this last that the word symbols in the different groups may be the same. The words in each group may be taken from successive parts, as the successive pages, of a primer.

The sheet is preferably divided into substantially regular columns of substantially similar sections by division markings, as intersecting lines $b$ and $c$, so that when the sheet is cut along the markings slips will be produced (designated $d$ in Figs. 3, 4 and 5) which are all alike in shape and size.

In the different sections are printed or otherwise displayed in substantially the same disposition, preferably at the left of each section, different words $e$, as "The," "Hen," "Found," together with serial word symbols $f$, one for each section, as the numbers "1," "2," "3," etc., preferably displayed at the right of the sections, the words and serial word symbols appearing on the obverse face of the sheet. In the different sections are displayed also set symbols $g$, as the numbers "1," "1," "1," preferably placed on the reverse side of the sheet, one to each section. It is not essential that the serial word symbols and the set symbols be disposed on opposite sides of the sheet, or sections; any other disposition will do so long as the word symbols are distinguishable from the set symbols as identifying the respective words to which they appertain, but the disposition described is preferred as throwing into the desired relative insignificance the set symbols and avoiding confusion.

Having a set or group of sheets so prepared, the teacher cuts them on the division markings into sets of slips $d$, and distributes to the class the several sets, one to a student. The teacher may retain one uncut sheet for his own use. The class may be provided with grooved holders $h$, shown in Figs. 5 and 6, in which the slips may be placed.

The teacher then calls one of the serial numbers and directs the class to select the slips from their sets of slips which bear that number and, having placed them in the holders, asks what word is displayed thereon. This is repeated as to slips bearing other numbers, the class selecting each time the proper slips and depositing them in the holders one after another, preferably in overlapping disposition as shown in Fig. 5, much after the manner of using the slips set forth in my Letters Patent No. 1,099,324. In this way a sentence, or any other word arrangement, may be built up, as will be obvious. Each child obtains association of the meaning of each word with its printed (or written) form quite apart from other words. Sentences or other word arrangements can, moreover, be arbitrarily formed, the words being shifted to different positions and different relations to others, thus avoiding entirely the rote-learning which attends the use of set sentences or groups of words on the printed page so troublesome in the respect already indicated herein.

When the slips are not in use, they are put up in packages, those given to each child by themselves, the set numbers or other symbols $g$ serving to identify the slips with their respective sets or packages.

As my invention is not limited to the teaching of the reading of words, I employ the term "elements of reading" hereinafter in the claim to include various printed or written symbols employed in printing or writing and used collectively, in different combinations, to express ideas, words, music, etc.

I claim:

Means for teaching reading consisting of a set of sheets each having on one face thereof different elements of reading and serial symbols coördinated on the sheet with said elements, the said elements and symbols being arranged to be read from the same position and in regular alternating vertical columns and with elements and symbols in the several columns horizontally alined with each other, each sheet being adapted to be divided to form slips on vertical lines, each extending between a column of elements and a column of symbols, and also on horizontal lines between the elements and symbols of said columns, each element and symbol being close to one such vertical line, whereby when the sheet is divided on said lines the resulting slips may be placed in overlapping laterally progressing disposition to form a reading line, each sheet having also, on the back thereof and one on each slip, identical markings for identifying the slips as belonging together.

In testimony whereof I affix my signature.

JENNIE L. THOMSON.